United States Patent
Akehurst-Ryan et al.

(10) Patent No.: US 9,264,236 B2
(45) Date of Patent: *Feb. 16, 2016

(54) EMBEDDED EXTRINSIC SOURCE FOR DIGITAL CERTIFICATE VALIDATION

(71) Applicant: International Business Machines Corporation, Armonk, NY (US)

(72) Inventors: Andrew D. Akehurst-Ryan, Southampton (GB); David J. McKechan, Winchester (GB); Stuart J. Reece, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,159

(22) Filed: Jan. 5, 2015

(65) Prior Publication Data

US 2015/0121069 A1 Apr. 30, 2015

Related U.S. Application Data

(63) Continuation of application No. 13/427,954, filed on Mar. 23, 2012, now Pat. No. 8,954,733.

(51) Int. Cl.
*H04L 9/32* (2006.01)
*H04L 29/06* (2006.01)
*H04L 9/00* (2006.01)

(52) U.S. Cl.
CPC .............. *H04L 9/3268* (2013.01); *H04L 9/32* (2013.01); *H04L 29/06* (2013.01); *H04L 63/06* (2013.01); *H04L 63/0823* (2013.01); *H04L 9/00* (2013.01)

(58) Field of Classification Search
USPC ......................................... 713/156, 157, 158
See application file for complete search history.

(56) References Cited

U.S. PATENT DOCUMENTS

| | | | |
|---|---|---|---|
| 6,393,563 B1 | 5/2002 | Maruyama et al. | |
| 7,266,685 B1 | 9/2007 | Meandzija et al. | |
| 7,353,396 B2 | 4/2008 | Micali et al. | |
| 7,490,241 B1 | 2/2009 | Peyravian et al. | |
| 7,549,051 B2 | 6/2009 | Dillaway et al. | |
| 8,001,371 B2 | 8/2011 | Langer | |
| 2006/0059346 A1 | 3/2006 | Sherman et al. | |
| 2009/0083372 A1* | 3/2009 | Teppler ........................ | 709/203 |
| 2010/0257358 A1* | 10/2010 | Grajek et al. ................. | 713/158 |

OTHER PUBLICATIONS

Cooper et al., "RFC 5280: Internet X.509 Public Key Infrastructure Certificate and Certificate Revocation List (CRL) Profile" [online]. May 2008, Copyright © The IETF Trust (2008), [retrieved on Mar. 19, 2012]. Retrieved from the internet:<URL: http://tools.ietf.org/pdf/rfc5280.pdf> Section 4, pp. 16-54.
U.S. Appl. No. 13/427,954, entitled "Embedded Extrinsic Source for Digital Certificate Validation", Filed Mar. 23, 2012.

* cited by examiner

*Primary Examiner* — Jeffrey Pwu
*Assistant Examiner* — Samuel Ambaye
(74) *Attorney, Agent, or Firm* — Maeve McCarthy; Stephen Yoder

(57) ABSTRACT

A computer uses the information included within a digital certificate to obtain a current date and time value from a trusted source extrinsic to the computer. The computer requests and receives the trusted current date and time value and compares the trusted current date and time value to a validity period included in the digital certificate, to determine if the digital certificate is expired. The information included within the digital certificate specifying an extrinsic source for the current date and time value can be included in an extension of the digital certificate, and the information can specify a plurality of extrinsic sources.

20 Claims, 6 Drawing Sheets

EMBEDDED EXTRINSIC SOURCE FOR DIGITAL CERTIFICATE VALIDATION

FIELD OF THE INVENTION

The present invention relates generally to verifying data contained within digital certificates and more particularly to the validation of digital certificates to determine expiration status.

BACKGROUND

Secure exchange of communications and transactions over public networks, such as the Internet, are prevalent. Secure network connections between computing devices requires, among other things, identity authentication. For example, online bank transactions require certainty that a client computer is in fact connected to the specific bank server computer with which the client wants to perform banking transactions. Digital certificates are recognized as a commonly practiced means of authenticating identities of computing devices such as server computers, client computers, network support computers or other computing devices, on the Internet or other networks. A public key certificate is one type of digital certificate that serves as electronic credentials which bind the identity of the certificate owner to a pair of digital keys (public and private). Digital keys can be used to encrypt, decrypt, and sign information digitally, forming a basis of secure communication and authentication over the Internet or other networks. Digital certificates enable network-interconnected computing devices to establish the identity of another computing device connected to the network by authentication from a trusted, known source referred to as a certification authority.

The certification authority is recognized and trusted by owners of both certificate sending and receiving computing devices on the network. The certification authority has important roles that include issuing digital certificates after authenticating the requestor's identity, providing public key-private key pairing, signing the digital certificate which confirms the certificate's authenticity, and managing the issued certificates by maintaining certificate revocation lists and possibly re-issuing expired certificates. By digitally signing a certificate the certification authority confirms the identity of the certificate subject (owner) and binds the identity to the public key in the certificate. Recipients of the public key certificate can trust that the subject holds the private key uniquely corresponding to the public key in the digital certificate. Once digitally signed, the contents of the certificate cannot be tampered with without detection and subsequent certificate rejection.

Public key certificates are made generally available and the public key can be used to encrypt data to be sent to the computing device holding the corresponding private key of the public-private key pair. In this manner only the holder of the private key can decrypt a message encrypted with the public key certificate.

Digital certificates are composed of attributes containing information used in authentication and can be thought of as a certificate's data structure. The data structure includes a serial number, information regarding the certificate issuer and subject, the public key, a validity period and other attributes. The validity period establishes the timeframe in which the certificate is valid. A computer's internal date and time is typically referred to as the local date and time. In addition to identity authentication, the validity period attribute of the certificate is compared to a local source of the current date and time. For example, a computing device having received a digital certificate may compare the validity period of the certificate to its internal current date and time value, to determine if the certificate has expired. If a certificate has expired it is considered to be invalid, is rejected, and the connection between the computing devices is typically discontinued.

SUMMARY

In embodiments of the present invention, a system, method, and program product are disclosed for validating a digital certificate. A computer receives a first digital certificate that includes within the first digital certificate, information specifying a first extrinsic source for obtaining a trusted current date and time value. The computer requests the trusted current date and time value, based on the information specifying the first extrinsic source that is included within the first digital certificate. The computer receives the trusted current date and time value, and the computer compares the trusted current date and time value to a validity period of the first digital certificate.

DETAILED DESCRIPTION

Detailed embodiments of the invention are disclosed herein; however, it is to be understood that the disclosed embodiments are merely illustrative of the invention that may be embodied in various and other forms. In addition, each of the examples given in connection with the various embodiments is intended to be illustrative, and not restrictive. Further, the figures are not necessarily inclusive of all programs and functions that may be performed, but rather include those to illustrate exemplary embodiments. Therefore, specific functional details disclosed herein are not to be interpreted as limiting, but merely as a representative basis for teaching one skilled in the art to variously employ the techniques of the present disclosure.

Figure 1:
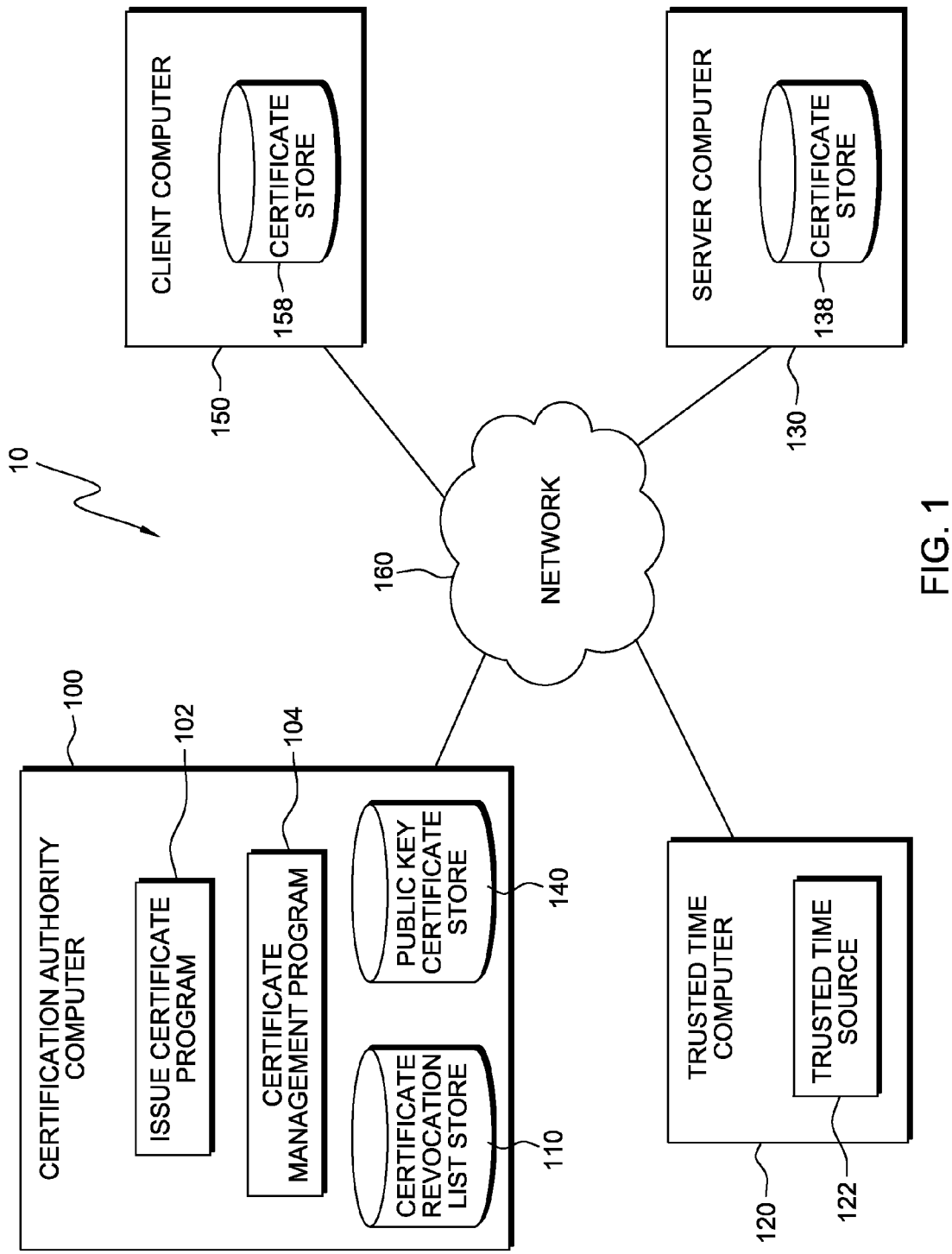
FIG. 1 is a block diagram of a distributed network system utilizing a public key infrastructure, in accordance with an embodiment of the present invention.

In one embodiment the invention involves the request, receipt, date and time validation and authentication of a digital certificate, between computing devices within a distributed network system utilizing a public key infrastructure. This will now be described in detail with reference to the accompanying drawings. It should be noted that although a public key certificate will be discussed for exemplary embodiments, other embodiments may utilize other types of digital certificates. FIG. 1 is a functional block diagram of distributed network system 10 utilizing a public key infrastructure (PKI), in accordance with one embodiment. A public key infrastructure environment enables users of an unsecured network, for example the Internet, to exchange secure messages and conduct secure transactions by using a public and private cryptographic key pair. A public key can be created and distributed by a certification authority and is typically included within a digital certificate. A digital certificate, also referred to here as a certificate, contains identifying and authenticating information which may be referred to as attributes of the certificate, as discussed further in FIG. 2. The public key attribute of a certificate is used for identification and for encryption and decryption of messages, enabling secure exchange and transactions across unsecured networks.

Distributed network system 10 in FIG. 1 includes components used in the public key infrastructure environment according to one embodiment, which includes certification authority computer 100, client computer 150, server computer 130, and trusted time computer 120, all interconnected through network 160. Additionally FIG. 1 illustrates two storage devices of certification authority computer 100, certificate revocation list store 110 and public key certificate store 140, which can be used by certification authority computer 100 for posting of certificate revocation lists and storing public key certificates for public access, respectively. Although represented separately, in one embodiment, certificate revocation list store 110 and public key certificate store 140 can be combined onto a single storage device or database, or in various other forms, combinations or distributions of storage. In one embodiment, certificate revocation list store 110 and public key certificate store 140 can be included within services and resources provided by certification authority computer 100, or in another embodiment, the storage can be provided by a delegate of certification authority computer 100, or a third-party (not illustrated), and accessed through network 160. Certification authority computer 100 assumes an important role in identity authentication of public key certificates associated with network users.

Figure 3B:
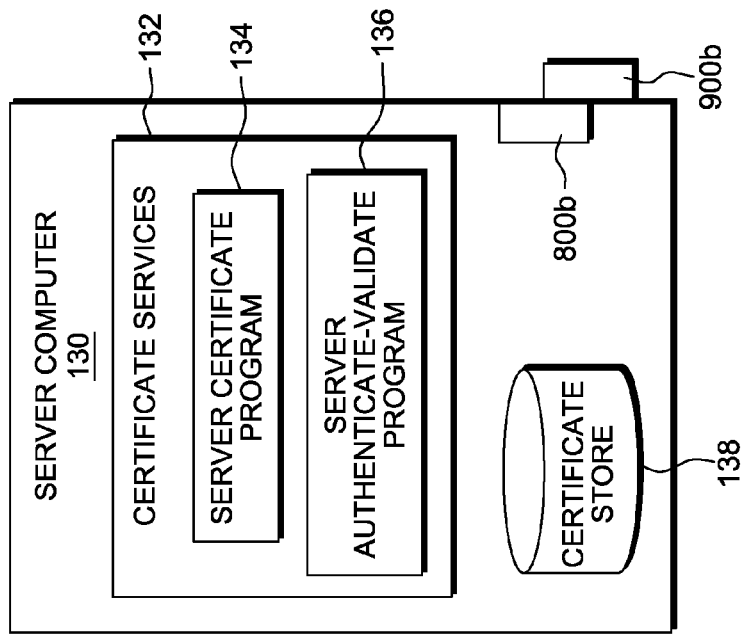
FIG. 3B is a block diagram illustrating a server computer and programs used in managing digital certificates, in accordance with an embodiment of the present invention.
Figure 3A:
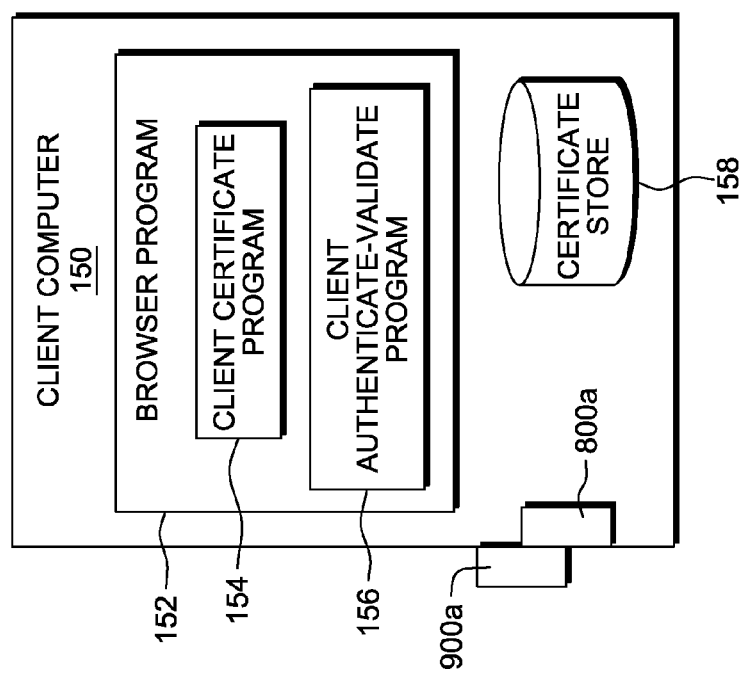
FIG. 3A is a block diagram illustrating a client computer and programs used in managing digital certificates, in accordance with an embodiment of the present invention.

FIG. 1 also illustrates client computer 150, further discussed in FIG. 3A, which can be a user computing device such as a laptop computer, tablet computer, or notebook personal computer (PC), a desktop computer, a personal digital assistant (PDA) or a smart phone. Client computer 150 can be any programmable electronic device or any other device or computing system capable of receiving input from a user and executing computer program instructions, as described in further detail with respect to FIG. 6.

FIG. 1 also illustrates server computer 130 which, in one embodiment, provides one or more resources or services that client computer 150 can access. Server computer 130, for example, can be a website server, a commercial transaction server for a banking business, a server used for retail purchases or for access to trade securities online or for supporting email exchange, or any service or transaction type that engages a connection with another computer or computing device.

FIG. 1 also illustrates trusted time computer 120 and trusted time source 122. In a preferred embodiment trusted time computer 120 can be a computing device capable of providing a current date and time value from trusted time source 122, which, for example, can be a certified source of the current date and time. Subsequent to receiving a request for the current date and time, trusted time computer 120 responds by obtaining the current date and time value from trusted time source 122 and sends the value over network 160 to the requesting entity. In a preferred embodiment, trusted time computer 120 may include the current date and time value from trusted time source 122 within a digitally signed message, or the current date and time value may be included in a signed digital certificate, for example. The receiving entity can determine if the digital signature is valid and if the information indicates any sign of tampering. Using information from trusted time source 122 to check if a certificate has expired, making the certificate invalid, removes the risk of tampering or falsifying the current date and time used for comparison and increases the trust of the certificate.

In one embodiment, trusted time computer 120 returns the date and time value matching the date and time of the request received from client computer 150. The use of the phrase "current date and time" is not meant to suggest or require any particular degree of precision or accuracy of time. In one embodiment, trusted time computer 120 may return the date and time value from trusted time source 122, corresponding to the date and time of when the trusted time computer receives the request from client computer 150, while taking into account one or more of computer, network, source transaction and other processing times. Further, in various embodiments, "current date and time" should be understood to include the date and the time, only the time, only the date, an elapsed time, or another chronological measurement, as utilized in the embodiment.

Trusted time source 122 in FIG. 1 may be, for example, the National Institute of Standards and Technology (NIST) or the United States Naval Observatory (USNO). In other embodiments trusted time source 122 can be part of a managed system of time synchronization among computing devices in a network using a Network Time Protocol (NTP) or Simple Network Time Protocol (SNTP), or trusted time source 122 can be provided by certification authority computer 100 or an entity designated by the certification authority computer, or some other entity. In another embodiment, trusted time computer 120 connected to trusted time source 122 can be any network-connected computing device directly connected to or otherwise connected to a source of current date and time that is trusted by the entity specifying the source, for example, certification authority computer 100, or a delegate of the certification authority computer. In general, trusted time source 122 can be trusted to be accurate and un-tampered-with, and connected to trusted time computer 120. Trusted time computer 120 is connected to network 160 and considered to be a network location source that returns a current date and time value in response to receiving a request from a computing device via network 160.

In one embodiment, trusted time computer 120 is specified by including information corresponding to a location of the trusted time computer as a source within the digital certificate, extrinsic to the computer using or validating the digital certificate. In a preferred embodiment the digital certificate includes network location information of trusted time computer 120, such as, for example, a uniform resource location (URL) address, an Internet Protocol (IP) address, or may be specified using other means. Client computer 150, using the network location information included in the digital certificate, contacts the network location, requests the current date and time value from trusted time computer 120, and receives the current date and time value. In another embodiment the digital certificate may contain network location information of a referring computer, so that client computer 150 can connect to the referring computer and from the referring computer obtain information specifying a second network location, which can be the network location for trusted time computer 120. In yet other embodiments, the digital certificate may contain network location information of an intermediary computer that, when contacted by client computer 150, contacts trusted time computer 120 and returns the current date and time value from the trusted time computer to the client computer. Other alternative embodiments are possible, and the scenarios above are not meant to be limiting, but rather to describe and provide examples of some implementations that are possible and in which the digital certificate includes various types of information regarding an extrinsic source to obtain a current date and time value from a trusted source.

FIG. 1 illustrates network 160, interconnecting certification authority computer 100, client computer 150, server computer 130 and trusted time computer 120 within distributed network system 10. Network 160 can be, for example, a local area network (LAN), a wide area network (WAN), the Internet, or a combination of the three, and can include wired, wireless, or fiber optic connections. In general, network 160 can be any combination of connections and protocols that will support communications between client computer 150, server computer 130, certification authority computer 100, and trusted time computer 120.

The illustration of certification authority computer 100 in FIG. 1 includes block diagrams representing a subset of the computer program functions performed by certification authority computer 100, as well as data repositories certificate revocation list store 110 and public key certificate store 140, in accordance with one embodiment. Certification authority computer 100 can be a public or private organization and certification authority computer 100 forms the basis of trust in authenticating the identity of users and providers of online network services and transactions.

In one embodiment, certification authority computer 100 is configured to execute programs representing multiple functions. The program names shown in FIGS. 1, 3A and 3B reflect a consolidation of functionality for example purposes, however, the programs may be known by other names or labels and may be used by or contained in browsers, operating systems or other computer programs, and may further be implemented as hardware or software, for example. Certification authority computer 100 may receive a request to create a public key digital certificate from an entity, for example an organization with a website that provides a service to its clients, or an online retailer that requires authentication of its server to customers, or a user of a client computer that requires a public key authenticated by certification authority computer 100.

In one embodiment, one of the primary functions of certification authority computer 100 is to issue digital certificates, performed by issue certificate program 102. After certification authority computer 100 confirms the identity of a network entity, for example server computer 130, issue certificate program 102 creates a digital certificate with attributes that include in part, the public key for server computer 130, the subject (server computer 130) and the digital signature of certification authority computer 100, which binds the identity of server computer 130 to the public key, within the digital certificate. Once signed by certification authority computer 100, the digital certificate cannot be changed and attempts of tampering render the certificate non-functional. The digital signature by certification authority computer 100 indicates that the subject of the certificate is authenticated by the certification authority and the subject of the certificate holds the private key associated with the public key certificate.

Also included in FIG. 1 is the illustration of certificate management program 104, which supports multiple functions associated with digital certificates, including some of which support the life-cycle of digital certificates. A digital certificate can be revoked by certification authority computer 100 for several reasons. For example, a certificate can be revoked for failure to pay a renewal fee, if the secrecy of the private key is compromised, or other reasons that require users to be aware that the certificate should not be trusted. In one embodiment, certification authority computer 100 uses certificate management program 104, to create and publish listings of revoked certificates. These lists can be transmitted and stored onto storage devices supporting certification authorities, as illustrated by certificate revocation list store 110, in FIG. 1. In other embodiments certificate revocation lists may be distributed to other network storage devices or the revocation status may be obtained by using an Online Certificate Status Protocol (OCSP) as an alternative to accessing certificate revocation lists. The revocation status may be obtained by other means by making the revocation status of a digital certificate available to network-connected computing devices.

In one embodiment, certification authority computer 100 uses certificate management program 104 to send the digital certificate created with issue certificate program 102 to public key certificate store 140. By placing the public key digital certificate in public key certificate store 140, certification authority computer 100 has distributed the public key to make it generally available. In other embodiments, the public key certificate may be distributed to other publicly available storage devices or by the owner (subject) of the certificate, as appropriate to the embodiment. In general, public key certificates are made publicly available to users that require the public key certificate for authenticating connections and securing transactions with the certificate subject, the holder of the private key counterpart of the public key certificate.

The programs illustrated in FIG. 1 are not intended to be all-inclusive of functions a certification authority, such as certification authority computer 100 for example, may perform, but rather intended to describe the functions the certification authority computer may typically perform relative to digital certificates in a public key infrastructure environment, within distributed network system 10, according to embodiments presented herein.

Figure 2:
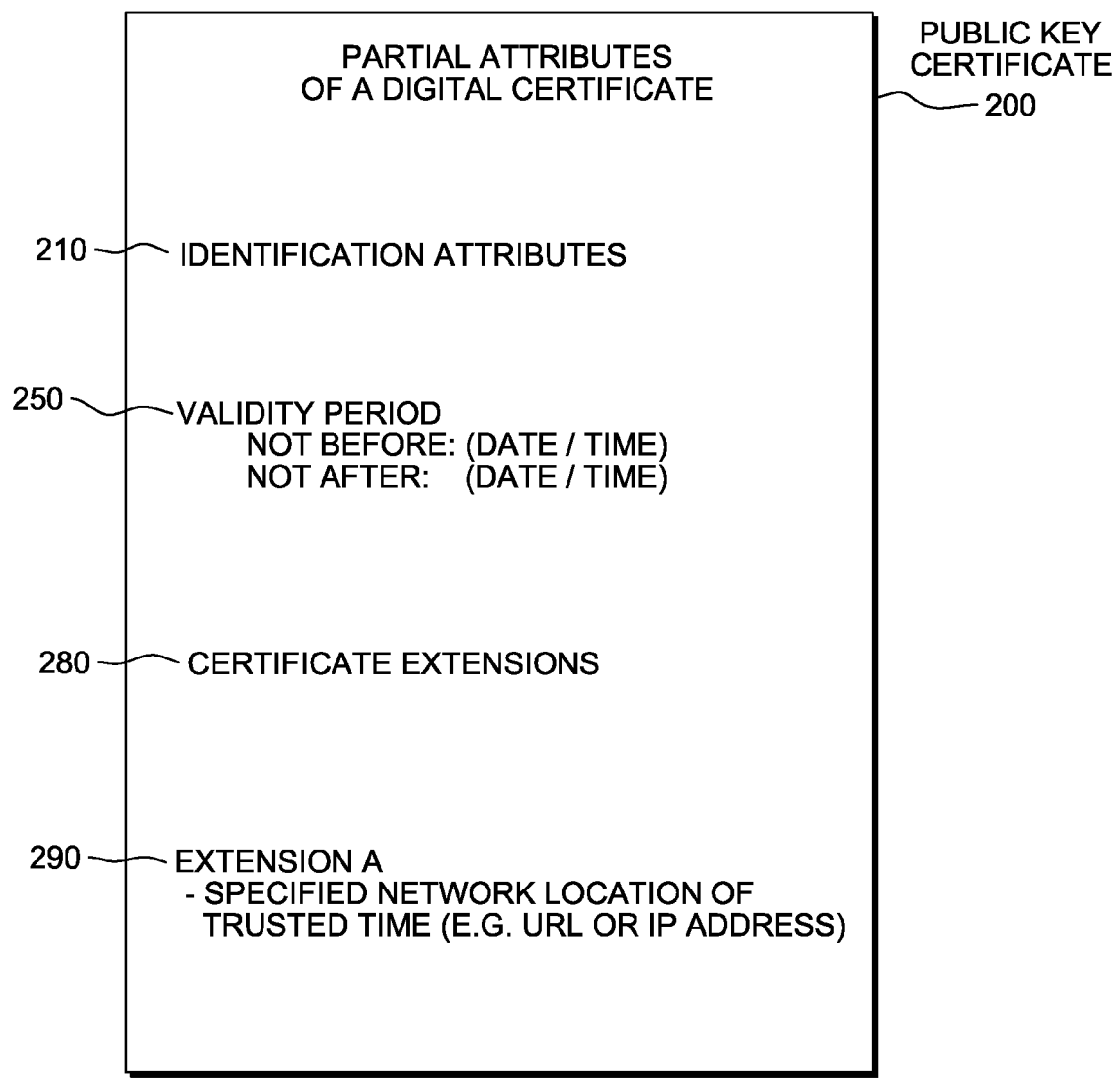
FIG. 2 is a diagram listing exemplary attributes of a digital certificate, in accordance with an embodiment of the present invention.

Many public key certificates in use are based on the X.509 v3 digital certificate standard, a recommendation of certificate syntax and format of the International Telecommunications Union Telecommunications Standardization Sector (ITU-T). Public key certificate 200 in FIG. 2 illustrates some of the attributes of a digital certificate following this standard. Public key certificate 200 also includes features of one embodiment.

Identification attributes 210 of public key certificate 200 represents a consolidation of several attributes that provide identification information within the digital certificate. Attributes contributing to certificate identification functions include the version number, serial number, digital signature and the signature cryptographic algorithm used to create the digital signature, the issuer or certification authority, the public key and the subject, which identifies the owning entity. A public key is one part of a uniquely related pair and the other part is the private key which is held in secret by the subject (owner). Only the private key of the pair can decrypt a message encrypted with the public key of the pair, and likewise, only the public key can decrypt a message encrypted with the private key of the pair or be used to confirm the digital signature made with the private key.

Public key certificate 200 has a lifetime which is defined by validity period 250 which is represented in FIG. 2 by a "not-before date and time" and a "not-after date and time". In one embodiment, the date and time values are expressed in Coordinated Universal Time (UTC) format. In other embodiments, the date and time values can be expressed in another appropriate format. If the current date and time value does not fall on or within the validity period, then public key certificate 200 is indicated to be invalid, or is indicated to have expired or not yet taken effect.

FIG. 2 also includes certificate extensions 280 and extension A 290. In one embodiment, extension A 290 is a certificate extension attribute that contains at least one specified network location of a trusted date and time source. In another embodiment, the information included in extension A 290 can represent any extrinsic source of current date and time information, such that the current date and time source is external to the computer using, or validating, public key certificate 200. Such an extrinsic source can be, for example, another network computing device, a non-network source, a direct connection source, or other source. Further, in another embodiment, the information within extension A 290 can be an intermediary location that subsequently redirects to or refers to a trusted source of current date and time, or to another intermediary location or sequence of intermediary locations that redirects to or refers to a trusted source of current date and time. The intermediary location, when contacted, may retrieve the current date and time value from a second location and send the current date and time value to the requesting computer. Alternatively the intermediary location may contact a second location who replies directly to the requesting computer, providing the current date and time value. Further, the intermediary location may be a referring location, referring the requesting computer to a second location. Extension A 290 may contain any information that enables the computer validating the digital certificate to obtain the current date and time value from an extrinsic source.

In one embodiment, a network entity, such as server computer 130, requests the issuance of a digital certificate from certification authority computer 100. The certification authority uses the public key of server computer 130 and the private key of certification authority computer 100 to create a digital certificate. The identity of the requesting entity, for example server computer 130, corresponds to the subject attribute in public key certificate 200. Certification authority computer 100 digitally signs the certificate using its private key and this binds subject public key to the certificate identity subject, which in this embodiment is server computer 130.

In one embodiment, public key certificate 200 contains extension attributes. Certificate extensions 280 includes one or more extensions which can provide a means of associating additional attribute information with a public key and for managing relationships and information between certification authorities, among other uses. In a preferred embodiment, a specified network location of a trusted time source, such as trusted time computer 120, for example, can be represented by a URL or by an IP address, included in one of the certificate extensions such as extension A 290, for example. In one embodiment, all extensions within certificate extensions 280 can assigned a criticality designation which can be set as either critical or non-critical by use of an indicator value, such as a Boolean value, for example. In addition, extension A 290 can contain one or more specified network locations from which a trusted current date and time value can be obtained. For example, in one embodiment, after receiving a digital certificate, such as public key certificate 200, a current date and time value can be obtained by client computer 150 or server computer 130 or any electronic device capable of receiving and running programmable code, by using the network location specified in extension A 290 of public key certificate 200.

FIG. 3A is a block diagram illustrating client computer 150, which in one embodiment includes browser program 152 containing the functional programs that client computer 150 uses to manage digital certificates, such as public key certificate 200 shown in FIG. 2. These programs may be in the form of hardware, software, programs, modules, dynamic linked library files, or any alternative such that client computer 150 can perform certificate management functions when needed. The program names reflect the consolidated functionality for some of the certificate management activities in one embodiment and there may be other embodiments in which certificate handling functionality may be known by alternative names or may be combined into fewer programs or distributed into a larger number of modules or programs.

Browser program 152 in FIG. 3A can be any one of several known and available browser programs. In one embodiment a web browser manages and displays web pages received over network 160 from specific network addresses, for example, URLs. Web browsers can also include add-on modules and functionality that manage digital certificates at the client computer level. In other cases the operating system of a computing device can contain program modules and functionality to manage digital certificates. The operating systems can be any of several operating systems available for client computer devices or server operating systems for server computers. In other embodiments, separate, specific programs may be used to manage digital certificates at the client computer level or server computer level.

In one embodiment, client computer 150 accesses a server website by means of browser program 152 and network 160 and uses client certificate program 154 to request a public key certificate from the contacted server. In other embodiments client computer 150 may use client certificate program 154 to connect with public key certificate store 140 to obtain the public key certificate of a server or in yet other embodiments, client computer 150 may have obtained and previously stored a public key certificate of the server in certificate store 158, which can used by client computer 150. In response to receiving the public key certificate of the contacted server, client computer 150 uses client authenticate-validate program 156 to confirm the identity of the certificate owner. In one embodiment, client computer 150 uses client certificate program 154 to obtain the public key digital certificate of certification authority computer 100, the issuer and signatory of the contacted server public key certificate. Alternatively, client computer 150 may have been pre-loaded with the public key certificate of certification authority computer 100 if the certification authority computer is well known and established. Therefore in another embodiment, the public key certificate for certification authority computer 100 may be retrieved by client computer 150 from a pre-loaded storage location within the storage memory of the client computer. Client authenticate-validate program 156 then uses the public key certificate of certification authority computer 100 to authenticate the signature on the certificate of the contacted server, confirming the identity of the contacted server. If the signatures are determined to match, the contacted server public key certificate is authenticated. Client computer 150 uses client certificate program 154 to store the public key certificates of the contacted server and certification authority computer 100 in certificate store 158. Although the discussion above of an embodiment of the present invention refers to client computer use of a web browser program and contacting web sites, an equally applicable embodiment may involve a client database application that may be connecting to a database server, for example.

In one embodiment, the validity of a certificate, such as public key certificate 200 discussed in FIG. 2, refers to the time period stated within an attribute of the certificate. The certificate validity is defined by a start period and end period designated as "not before" date and time and "not after" date and time, respectively, as illustrated by validity period 250 in FIG. 2. In one embodiment, client computer 150 uses client authenticate-validate program 156 to request a current date and time value from a network location specified within public key certificate 200. The network location specified within the digital certificate can be, for example, trusted time computer 120, which provides a current date and time value from trusted time source 122, sent to client computer 150 over network 160, to determine if public key certificate 200 is valid and is not expired.

As a further exemplary embodiment, client authenticate-validate program 156, uses at least one of more than one URL addresses within public key certificate 200, one being that of the NIST for example, and requests the current date and time value. If a response is not received from one of the network locations specified within public key certificate 200, then client authenticate-validate program 156 requests a current date and time value from another network location specified within the certificate. Client authenticate-validate program 156 compares validity period 250 to the current date and time value received from trusted time computer 120 and determines if the current date and time value falls within the range of the validity period. If the current date and time value falls on or within the range of validity period 250, then public key certificate 200 has not expired and is considered to be valid, but if it falls outside of the range of the validity period, then public key certificate 200 has expired and is considered to be invalid. In various embodiments, the range limits of validity period 250 may be included or excluded when determining the certificate validity period range.

In another embodiment, public key certificate 200 may have one or more network locations included within extension A 290, which is one extension within certificate extensions 280 contained in public key certificate 200, as shown in FIG. 2. Client authenticate-validate program 156 uses one of the more than one network locations included within extension A 290 to request and receive a current date and time value and determine if public key certificate 200 is valid and is not expired.

In one embodiment the network location information specified within the digital certificate, for example, can be a URL address or an IP address of trusted time computer 120, or can be some other means of network location. Trusted time computer 120 can be connected to trusted time source 122 which might be, for example, the NIST, the USNO or the World Clock website, or other sources of date and time services, and may involve use of NTP or other protocols to request and receive a current date and time value from a specified network location. In other embodiments the specified network location can be a web address of a current date and time source designated, for example, by the certificate issuer, it may be a current date and time source maintained by certification authority computer 100 or a third party designated by certification authority computer 100 or may be designated by another entity.

In addition to client authenticate-validate program 156 performing authentication and validation functions, client computer 150 uses client certificate program 154 to determine if public key certificate 200 has been revoked by the issuer, certification authority computer 100. For example, client certificate program 154 may access certificate revocation list store 110, located in a storage device connected to network 160, or client certificate program 154 may use an online certificate status protocol (OCSP) to determine if public key certificate 200 has been revoked by the issuer, certification authority computer 100.

FIG. 3B depicts server computer 130, which includes programs that perform various digital certificate functions. Certificate services 132 is illustrated as a collection of some of the functional programs to manage certificates for server computer 130. Server certificate program 134 and server authenticate-validate program 136, correspond to client certificate program 154 and client authenticate-validate program 156, respectively, described in detail above for client computer 150. Server certificate program 134 and server authenticate-validate program 136 perform functions from the perspective of server computer 130, and are similar to the functions client certificate program 154 and client authenticate-validate program 156 perform from the perspective of client computer 150. Additionally FIG. 3B illustrates certificate store 138, to which server computer 130 has access for storage and retrieval of certificates. Server certificate program 134 and server authenticate-validate program 136, may be in the form of hardware, software, programs, modules, dynamic linked library files, or any alternative such that server computer 130 can perform the certificate management functions when needed. The names of programs reflect a consolidation of the multiple functional activities in certificate handling for one embodiment and certificate handling functions may be known by alternative names or may be combined into fewer programs or distributed into a larger number of modules or programs, in other embodiments.

Figure 4:
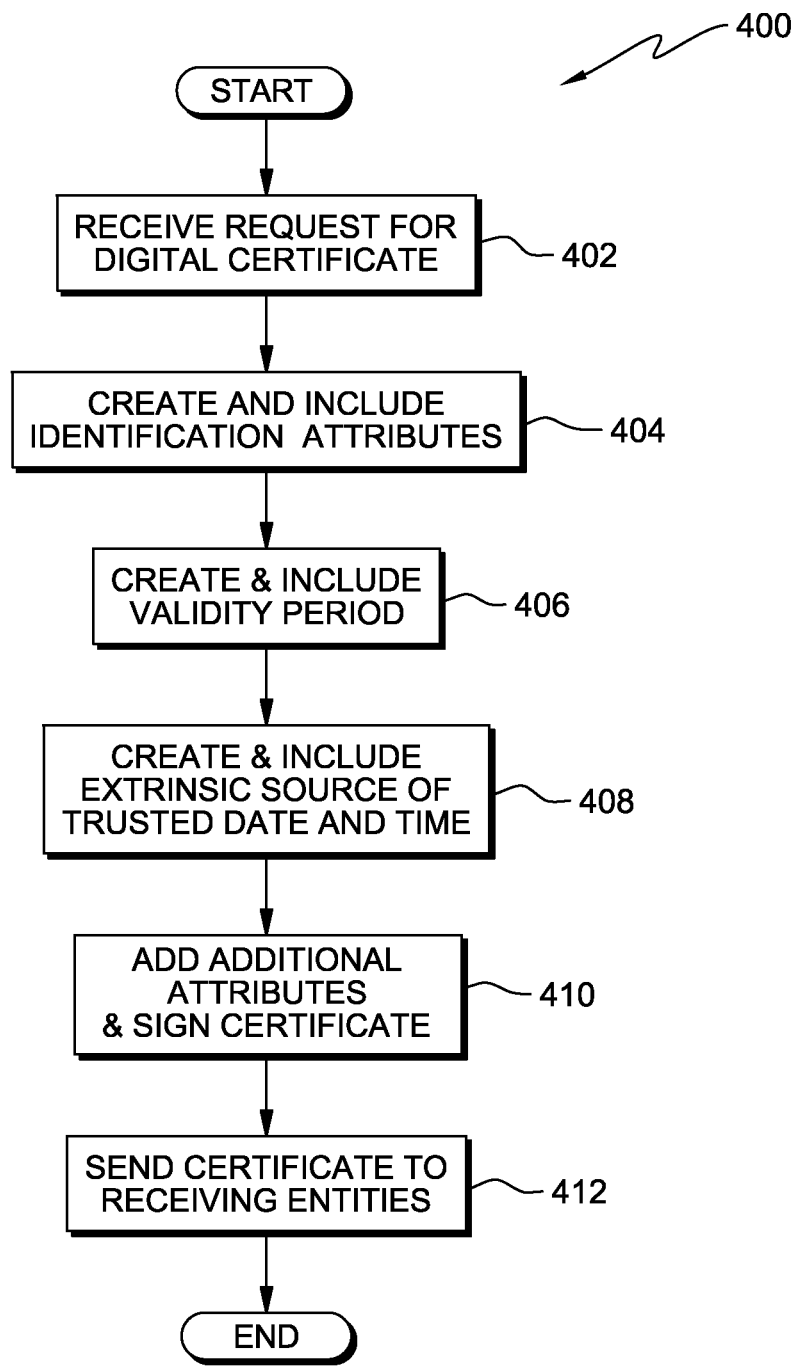
FIG. 4 is a flowchart depicting the computer program steps of creating a digital certificate including an extrinsic source and sending the certificate to receiving entities.

FIG. 4 illustrates flowchart 400 which includes steps of issue certificate program 102, used by certification authority computer 100 to create digital certificates. In one embodiment, certification authority computer 100 receives a request for a digital certificate in step 402. Certification authority computer 100, using issue certificate program 102, creates the digital certificate which can be represented by public key certificate 200 in FIG. 2. In step 404 issue certificate program 102 creates and includes in the digital certificate, the identification attributes, some of which may include the certificate version number, serial number, digital signature, signature cryptographic algorithm, issuer, public key, and subject. In step 406, certification authority computer 100, using issue certificate program 102, determines and includes the validity period for the requested digital certificate which can be any date and time range that meets the requirements of a specific embodiment. In step 408, issue certificate program 102 adds information regarding an extrinsic source to the digital certificate, which in a preferred embodiment, can be a network location from which a trusted current date and time value can be obtained, added to an extension of the digital certificate. As mentioned in the discussion of FIG. 2, the addition of information regarding an extrinsic source may include information regarding more than one extrinsic source.

In step 410, additional certificate attributes can be included in the certificate as defined by the embodiment, and the certificate is signed using the private key of certification authority computer 100. This binds the information within the certificate to the identity and public key of the subject or owner, and the certification authority signature can be authenticated against the public key certificate of the certification authority, to determine that the information within the certificate has not been tampered with. Certification authority computer 100, using issue certificate program 102, in step 412 sends the signed digital certificate to appropriate receiving entities. Such entities can be the requesting entity, a publicly accessible network storage device, or any receiving entity that makes the certificate appropriately available. Having made the digital certificate appropriately available, issue certificate program 102 ends. In one embodiment, a computer, such as client computer 150, can request the certificate from the subject or owner, or the client computer can obtain the certificate from a publicly accessible network storage device using client certificate program 154, or the certificate may be preloaded in a program located on a computer-readable, tangible storage device of the client computer. In response to receiving the certificate, client certificate program 154 initiates client authenticate-validate program 156 which in one embodiment authenticates and validates the certificate, as illustrated in flowchart 500 of FIG. 5.

Figure 5:
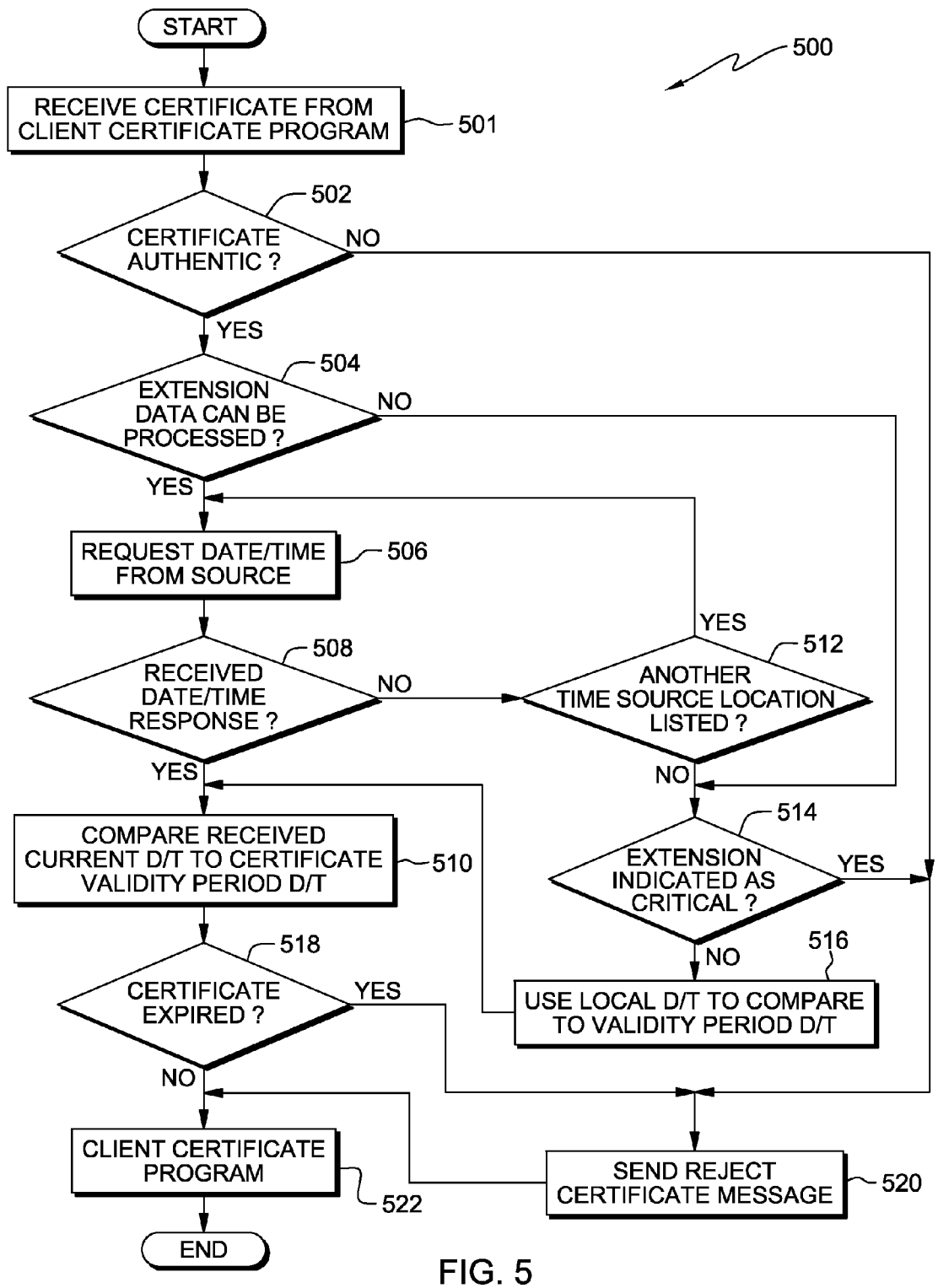
FIG. 5 is a flowchart depicting the computer program steps determining if a digital certificate has expired, in accordance with an embodiment of the present invention.

Flowchart 500 in FIG. 5 illustrates a validating public key certificate 200 embodiment. Client authenticate-validate program 156, and server authenticate-validate program 136, each perform similar functional steps and can be represented by the flowchart 500. As such, in the following discussion, it should be understood that references to client authenticate-validate program 156 can also be representative of server authenticate-validate program 136, as appropriate.

In a preferred embodiment, in flowchart 500 of FIG. 5, client computer 150 using client certificate program 154, requests the public key certificate of server computer 130, and after receiving the public key certificate from the server computer, initiates client authenticate-validate program 156. In step 502, client authenticate-validate program 156 uses the public key digital certificate of certification authority computer 100, received from client certificate program 154, to authenticate the digital signature of the certification authority computer on the public key certificate of server computer 130. The authentication also verifies the binding of the identity of server computer 130 with the public key of the digital certificate. If the certificate is not confirmed to be authentic, client authenticate-validate program 156 follows the "NO" path of step 502, to step 520 where a reject message is sent to client certificate program 154. Client certificate program 154 rejects the certificate and ends the connection between client computer 150 and server computer 130.

In a preferred embodiment, once the identity of the digital certificate is confirmed in step 502, client computer 150, while performing client authenticate-validate program 156 in step 504, determines that there is one or more network location specified within the certificate, for example within a certificate extension, and the network location information can be processed. Client authenticate-validate program 156 sends a request for a current date and time value to the network location specified within the certificate extension, in step 506. In step 508, client authenticate-validate program 156 determines if a current date and time value is received, and if confirmed, continues to step 510. Client authenticate-validate program 156 reads the validity period from the digital certificate, in step 510 of FIG. 5, and compares the current date and time value received from the network location information in the certificate extension, to the certificate validity period.

In step 518, client authenticate-validate program 156 determines if the certificate is valid or if it is expired. If the current date and time value falls within the certificate validity period range, the certificate is valid, or alternatively, if the current date and time value falls outside of the certificate validity period range, then the certificate is expired and is invalid. Of course, testing whether a current date and time value falls within a certificate validity period range can be preformed inclusive of the range limits, in one embodiment, or exclusive of the range limits in another embodiment, or otherwise, as required. If client computer 150 performing client authenticate-validate program 156 determines in step 518 that the certificate is expired, then client authenticate-validate program 156 proceeds to step 520. In step 520 a reject message is sent to client certificate program 154, which in response rejects the certificate and drops the connection with server computer 130, in step 522. If it is determined in step 518 that the certificate is valid, then client authenticate-validate program 156 communicates with client certificate program 154 in step 522, to continue subsequent processing, such as checking certification revocation lists, for example, and client authenticate-validate program 156 ends.

In one embodiment client computer 150, while performing client authenticate-validate program 156 in step 504, determines that the digital certificate includes extension A 290 which is designated to contain one or more network locations from which a current date and time value can be obtained. Extensions included within the digital certificate can be designated as either critical or non-critical. A computing device processing a digital certificate can reject the certificate if the computing device encounters a critical extension that the computing device does not recognize or a critical extension that contains information that the computing device cannot process, such as partial, missing, or defective information. In contrast a computing device may ignore a non-critical extension if it is not recognized or cannot be processed. If recognized, the non-critical extension is processed. In one embodiment, in step 504, client authenticate-validate program 156 cannot process the information in the extension for the network location of a source for a current date and time value and follows the "No" path to step 514. Client authenticate-validate program 156 determines in step 514 that the extension is indicated as critical, and follows the "Yes" path to step 520 where client authenticate-validate program sends a message to client certificate program 154 to reject the certificate. Alternatively, in another embodiment, in step 514, if client authenticate-validate program 156 determines the certificate extension to be non-critical, then processing follows the "No" path to step 516 and the local date and time value is used to compare to the validity period of the certificate.

There may be other embodiments where different behaviors are defined in client authenticate-validate program 156, in response to unrecognized, missing or defective information in extensions or otherwise within the digital certificate. In yet other embodiments, security policies may be included in operating systems, browsers or other programs on the computing device that support determining the validity of a digital certificate and these policies may dictate appropriate responses to the processing failure of extrinsic source information within a digital certificate.

Returning to step 508, in one embodiment in which client authenticate-validate program 156 determines whether a response to a current date and time value request is received, if a response is not received, client authenticate-validate program 156 then determines in step 512 if there is another network location for a current date and time value specified within the certificate extension. If found, client authenticate-validate program 156, using the other network location, sends a request in step 506, and in step 508 determines if a current date and time value is received. In one embodiment, in step 508, a received current date and time value may be checked for digital signature authentication if the trusted time source provided the current date and time in a digitally secured format. Step 508 may include authenticating the digital signature of the obtained current date and time value which can be used in step 510. If the digital signature is not authenticated, then the process proceeds to step 512 to determine if another source of current date and time is available.

If a current date and time value is received in step 508, then client authenticate-validate program 156 continues with step 510 as described previously. If a current date and time value is not received in step 508, then client authenticate-validate program 156 proceeds to step 512, to determine if yet another network location for a current date and time value is available and proceeds as described above. If another specified network location cannot be found by client authenticate-validate program 156 in step 512, then client authenticate-validate program 156 proceeds to step 514. In step 514, if client computer 150 performing client authenticate-validate program 156, determines that the certificate extension is indicated to be critical and the network location information has been exhausted without receiving a current date and time value, then client authenticate-validate program 156 proceeds to step 520 where a reject message is sent to client certificate program 154. In response to receiving the reject message, client certificate program 154, rejects the certificate and drops the connection between client computer 150 and server computer 130, in step 522.

Alternatively, client authenticate-validate program 156 after determining in step 514 that the certificate extension designated to hold network location information is non-critical and the network location information is not recognized, or cannot be processed, checks for additional network location information. If additional network location information is exhausted without receiving a current date and time value, then client authenticate-validate program 156 proceeds to step 516 and defaults to retrieve the local computer date and time value to perform step 510 validity check.

In one embodiment, client authenticate-validate program 156 determines in step 518 that the certificate is valid, and client computer 150 continues in step 522 with client certificate program 154 performing additional functions such as using checking revocation lists, for example, and client authenticate-validate program 156 ends. In step 518, if the certificate is determined to be expired or invalid, then in step 520, the client authenticate-validate program 156 sends a reject message to client certificate program 154 and client authenticate-validate 156 ends. Client certificate program 154 receives the reject message and the certificate is rejected and the connection is dropped, in step 522.

Although a public key certificate in a public key infrastructure environment is used in the description of several embodiments above, there is no intention of implied or stated limit of the invention to a public key certificate or to a public key infrastructure environment. Other embodiments may include digital certificates of any type or purpose, containing a validity period or validity date and time, and can have the validity period or validity date and time compared to a current date and time value obtained from specified network location information or by using the extrinsic source information from within the digital certificate. A different type of digital certificate, for example an attribute certificate (AC), may include content and information different than a public key certificate and be used for different purposes than a public key certificate, however, the different type of digital certificate may be included in other embodiments of the present invention where determining the validity of the certificate is required. The examples presented here are not intended to limit, but rather to illustrate the techniques disclosed.

Figure 6:
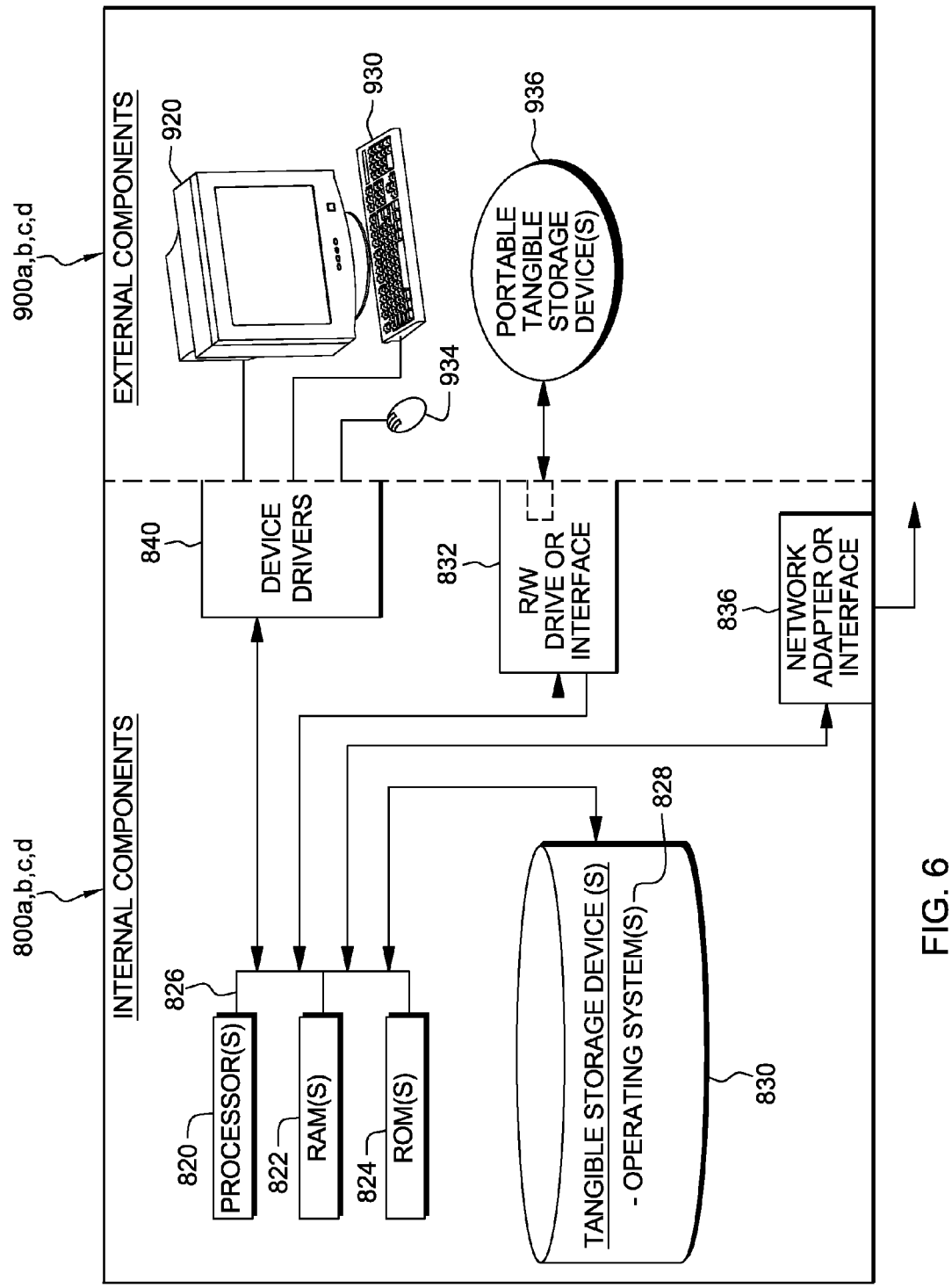
FIG. 6 is a block diagram of hardware and software within a computer in accordance with an embodiment of the present invention.

FIG. 6 shows a block diagram of the components of a data processing system 800, 900, such as client computer 150, server computer 130, trusted time computer 120, or certification authority computer 100, in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, tablet computing devices, smart phones, net book computers, multiprocessor systems, microprocessor-based systems, network PCs, minicomputer systems, and distributed cloud computing environments that include any of the above systems or devices.

Client computer 150, trusted time computer 120, server computer 130 or certification authority computer 100, include respective sets of internal components 800 a, b, c, d, and external components 900 a, b, c, d, illustrated in FIG. 6. Each of the sets of internal components 800 a, b, c, d, includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 152, 154, and 156, in client computer 150; programs 132, 134, and 136 in server computer 130; programs 102, and 104 in certification authority computer 100 and programs (not illustrated) in trusted time computer 120, are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, c, d, also includes a R/W drive or interface 832 to read from and write to one or more portable computer-readable tangible storage devices 936 such as a CD-ROM, DVD, memory stick, magnetic tape, magnetic disk, optical disk or semiconductor storage device. Programs 152, 154, and 156, in client computing device 150; programs 132, 134, and 136 in server computer 130; programs 102 and 104, in certification authority computer 100; and programs (not illustrated) in trusted time computer 120, can be stored on one or more of the respective portable computer-readable tangible storage devices 936, read via the respective R/W drive or interface 832 and loaded into the respective hard drive 830.

Each set of internal components 800 a, b, c, d, also includes network adapters or interfaces 836 such as a TCP/IP adapter cards, wireless wi-fi interface cards, or 3G or 4G wireless interface cards or other wired or wireless communication links. Programs 152, 154, and 156, in client computer 150;

programs 132, 134, and 136, in server computer 130; programs 102 and 104, in certification authority computer 100; and programs (not illustrated) in trusted time computer 120, can be downloaded to respective computers 150, 130, 100, and 120 from an external computer via a network (for example, the Internet, a local area network or other, wide area network) and respective network adapters or interfaces 836. From the network adapters or interfaces 836, the programs 152, 154, and 156, in client computer 150; programs 132, 134, and 136, in server computer 130; programs 102 and 104, in certification authority computer 100; and programs (not illustrated) in trusted time computer 120, are loaded into the respective hard drive 830. The network may comprise copper wires, optical fibers, wireless transmission, routers, firewalls, switches, gateway computers and/or edge servers.

Each of the sets of external components 900 a, b, c, d, can include a computer display monitor 920, a keyboard 930, and a computer mouse 934. External components 900 a, b, c, d, can also include touch screens, virtual keyboards, touch pads, pointing devices, and other human interface devices. Each of the sets of internal components 800 a, b, c, d, also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method of validating a digital certificate, the method comprising:
a computer receiving a first digital certificate that includes within the first digital certificate, information specifying a first extrinsic source of a trusted current date and time value;
the computer reading the information included within the first digital certificate specifying the first extrinsic source of the trusted current date and time value;
the computer requesting the trusted current date and time value, based on the information specifying the first extrinsic source that is included within the first digital certificate;
the computer receiving the trusted current date and time value; and
the computer comparing the trusted current date and time value to a validity period of the first digital certificate.

2. The method of claim 1, wherein the information specifying the first extrinsic source includes a uniform resource locator (URL) address.

3. The method of claim 1, wherein the trusted current data and time is received from the first extrinsic source, specified within the first digital certificate.

4. The method of claim 1, further comprising the step of the computer requesting the trusted current date and time value from a second extrinsic source based on information specifying the second extrinsic source included within the first digital certificate.

5. The method of claim 4, wherein the step of the computer receiving the trusted current date and time value includes the computer receiving the trusted current date and time value from the second extrinsic source.

6. The method of claim 4, wherein a network address of the second extrinsic source is received by the computer from the first extrinsic source.

7. The method of claim 5 wherein the trusted current date and time value is provided to the first extrinsic source by the second extrinsic source, and wherein the trusted current date and time value is provided to the computer by the first extrinsic source.

8. The method of claim 1 wherein the step of the computer receiving the first digital certificate further includes information included within the first digital certificate specifying a plurality of extrinsic sources.

9. The method of claim 1, wherein the information specifying the first extrinsic source is included within an extension section within the first digital certificate.

10. The method of claim 1, wherein the step of the computer receiving the trusted current date and time value, includes receiving the trusted current date and time value within a second digital certificate sent from the extrinsic source whose location information is included within the first digital certificate.

11. A computer program product to validate a digital certificate, the computer program product comprising:
one or more computer-readable storage devices and program instructions stored on at least one of the one or more tangible storage devices, the program instructions comprising:

program instructions to receive a first digital certificate that includes within the first digital certificate, information specifying a first extrinsic source of a trusted current date and time value;

the computer reading the information included within the first digital certificate specifying the first extrinsic source of the trusted current date and time value;

program instructions to request the trusted current date and time value, based on the information specifying the first extrinsic source that is included within the first digital certificate;

the computer receiving the trusted current date and time value; and the computer comparing the trusted current date and time value to a validity period of the first digital certificate.

12. The computer program product of claim 11, wherein the information specifying the first extrinsic source includes a uniform resource locator (URL) address.

13. The computer program product of claim 11, further comprising the step of the computer requesting the trusted current date and time value from a second extrinsic source, based on information specifying the second extrinsic source included within the first digital certificate.

14. The computer program product of claim 13, wherein the step of the computer receiving the trusted current date and time value includes the computer receiving the trusted current date and time value from the second extrinsic source.

15. The computer program product of claim 13, wherein a network address of the second extrinsic source is received by the computer from the first extrinsic source.

16. The computer program product of claim 14 wherein the trusted current date and time value is provided to the first extrinsic source by the second extrinsic source, and wherein the trusted current date and time value is provided to the computer by the first extrinsic source.

17. The computer program product of claim 11, wherein the information specifying the first extrinsic source is included within an extension section within the first digital certificate.

18. The computer program product of claim 11, wherein the program instructions of receiving the trusted current date and time value, includes receiving the trusted current date and time value within a second digital certificate sent from the extrinsic source whose location information is included within the first digital certificate.

19. A method of creating a digital certificate, the method comprising the steps of:

a computer creating a digital certificate that includes within the digital certificate, information specifying one or more extrinsic sources of a trusted current date and time value; and the computer distributing the digital certificate to a receiving computer, wherein the receiving computer is configured to request a trusted current date and time value from at least one of the one or more extrinsic sources of a trusted current date and time value, based on the information specifying the one or more extrinsic sources included within the digital certificate, and the receiving computer is configured to receive the trusted current date and time value, and compare the trusted current date and time value that is received from the one or more extrinsic sources, to a validity period included within the digital certificate.

20. The method of claim 1, wherein the information specifying the first extrinsic source of a trusted current date and time value is included within the digital certificate upon the generation of the digital certificate.

* * * * *